(12) United States Patent
Tilleman et al.

(10) Patent No.: US 7,969,644 B2
(45) Date of Patent: Jun. 28, 2011

(54) SYSTEM AND METHOD FOR DESPECKLING AN IMAGE ILLUMINATED BY A COHERENT LIGHT SOURCE

(75) Inventors: Michael M. Tilleman, Arlington, MA (US); Joseph Thomas Traynor, North Berwick, ME (US)

(73) Assignee: Elbit Systems of America, LLC, Forth Worth, TX (US)

( * ) Notice: Subject to any disclaimer, the term of this patent is extended or adjusted under 35 U.S.C. 154(b) by 264 days.

(21) Appl. No.: 12/337,111

(22) Filed: Dec. 17, 2008

(65) Prior Publication Data

US 2010/0053729 A1    Mar. 4, 2010

Related U.S. Application Data

(60) Provisional application No. 61/093,626, filed on Sep. 2, 2008.

(51) Int. Cl.
*G02B 26/08* (2006.01)
*G02B 26/00* (2006.01)
*G02B 27/14* (2006.01)

(52) U.S. Cl. .................. 359/298; 359/290; 359/630

(58) Field of Classification Search .......... 359/290–298, 359/619–634, 646; 372/39, 43, 50, 102; 345/7–9

See application file for complete search history.

(56) References Cited

U.S. PATENT DOCUMENTS

| | | | |
|---|---|---|---|
| 3,588,217 A | 6/1971 | Mathisen | 350/3.5 |
| 4,155,630 A | 5/1979 | Ih | 359/707 |
| 5,029,975 A | 7/1991 | Pease | 350/96.27 |
| 5,729,374 A | 3/1998 | Tiszauer et al. | 359/212 |
| 6,594,090 B2 | 7/2003 | Kruschwitz et al. | 359/707 |
| 6,606,173 B2 | 8/2003 | Kappel et al. | 359/15 |
| 6,870,650 B2 | 3/2005 | Kappel et al. | 359/15 |
| 6,884,993 B2 * | 4/2005 | Ahten et al. | 250/234 |
| 6,952,435 B2 | 10/2005 | Lai et al. | 372/9 |
| 6,955,436 B2 | 10/2005 | Watanabe | 353/122 |
| 7,046,446 B1 | 5/2006 | Kowarz et al. | 359/618 |
| 7,119,936 B2 | 10/2006 | Kowarz et al. | 359/224 |
| 7,193,765 B2 | 3/2007 | Christensen et al. | 359/279 |
| 7,196,849 B2 * | 3/2007 | McGuire et al. | 359/630 |
| 7,355,657 B2 * | 4/2008 | Chilla et al. | 348/744 |
| 7,542,209 B2 * | 6/2009 | McGuire, Jr. | 359/630 |

FOREIGN PATENT DOCUMENTS

| | | |
|---|---|---|
| EP | 1 292 134 A2 | 3/2003 |
| WO | WO 95/20811 | 8/1995 |
| WO | WO 02/31575 A2 | 4/2002 |
| WO | WO 03/001281 A1 | 1/2003 |

OTHER PUBLICATIONS

PCT Notification of Transmittal of the International Search Report and the Written Opinion of the International Searching Authority, or the Declaration; International Application No. PCT/US2009/050786, Sep. 17, 2009. *Speckle Reduction in Coherent Information Processing* by Toshiaki Iwai and Toshimitsu Asakura; Proceedings of the IEEE, vol. 84, No. 5, May 1996.

* cited by examiner

*Primary Examiner* — Mohammed Hasan
(74) *Attorney, Agent, or Firm* — Baker Botts L.L.P.

(57) ABSTRACT

A method and system for reducing speckle in an image produced from a coherent source of radiation is provided. The method includes coupling a source beam received from a coherent optical source into an optical fiber. A position of at least a portion of the fiber may be modulated using a ditherer. The source beam may be refracted by a lens after it is decoupled from the optical fiber, such that the source beam is aimed at a microlens diffuser. In accordance with a particular embodiment, the source beam may be projected from the microlens diffuser onto a spatial modulator. The spatial modulator may be positioned to project the source beam via an imaging lens, to a target.

24 Claims, 4 Drawing Sheets

SYSTEM AND METHOD FOR DESPECKLING AN IMAGE ILLUMINATED BY A COHERENT LIGHT SOURCE

RELATED APPLICATIONS

This application claims priority to U.S. Ser. No. 61/093,626, entitled SPECKLE FREE LASER GENERATED IMAGE OBTAINED BY MICROLENS ARRAY WITH DITHERED MULTIMODE FIBER, and filed on Sep. 2, 2008, which is hereby incorporated by reference.

TECHNICAL FIELD OF THE INVENTION

This invention relates generally to imaging systems and more particularly to a system and method for reducing speckle in an image illuminated by a coherent light source.

BACKGROUND OF THE INVENTION

To improve the resolution and brightness of imaging systems and to provide better picture quality, sources of coherent light such as lasers may be used in the place of sources of incoherent light such as light-emitting-diodes (LEDs) and lamps. However, picture quality may still suffer since sources of coherent light often produce images having a noticeable pattern underlying the image. This underlying pattern, also known as speckle, arises due to the high coherence of the source light. Lasers, which are quasi-monochromatic and coherent, transmit waves of electromagnetic radiation that are largely in phase. Because in phase electromagnetic radiation results in light-wave fronts arriving at a target or display at the same time, upon interaction with the target surface the individual light waves interfere with one another. If this surface is rough and imperfectly smooth then the interference between the light waves interferes constructively and destructively thus forming a pattern of bright and dark fringes, and an image may appear grainy to a viewer.

SUMMARY OF THE INVENTION

According to one embodiment, a method for reducing speckles in an image produced from a coherent source of radiation is provided. The method includes coupling a source beam received from a coherent optical source into a multimode optical fiber. A position of at least a portion of the fiber may be modulated using a ditherer. The source beam may be refracted in a lens after it is decoupled from the optical fiber, such that the source beam is aimed at a microlens diffuser. In accordance with a particular embodiment, the source beam may be projected from the microlens diffuser onto a spatial modulator that generates the image. The spatial modulator may be positioned to project the source beam via an imaging lens, to a target.

In accordance with another embodiment, an image generation system includes an optical multimode fiber positioned to receive a source beam from a coherent optical source. A ditherer may be coupled with the optical fiber to modulate a position of at least a portion of the optical fiber. A lens is configured to refract the source beam such that the source beam is aimed at a microlens diffuser. In accordance with a particular embodiment, the microlens diffuser is positioned to project the source beam onto a spatial modulator. The spatial modulator may be positioned to project the source beam via an imaging lens, to a target.

Some embodiments of the invention provide numerous technical advantages. Some embodiments may benefit from some, none, or all of these advantages. For example, according to one embodiment, sources of coherent light may be used to produce images with improved speckle contrast. Noticeable grainy patterns underlying the image may be reduced, and thus, viewer satisfaction with the imaging system may be improved.

Specifically, an advantage may be that speckles caused by the inherent properties of multimode optical fibers may be reduced. By modulating the position of the multimode optical fiber, the power distribution in each mode sustained by the optical fiber may be altered. In particular embodiments, the position modulation of the optical fiber may be controlled by dithering using an electromechanical ditherer such that by applying a voltage selectively, a predictable reduction in speckle contrast will result.

Still another advantage may be that, speckles introduced into an image due to surface roughness, of the display target may be reduced. For example, a microlens array may be used, in particular embodiments, to provide beam homogenization and arbitrary illumination profile conversion. The microlens array may convert a beam of coherent radiation into a multitude of beamlets that diverge to overlap each other on the screen, diffuser, combiner, or other target display.

The resulting pattern on a screen is known in the art as mode interference or modal noise. Upon altering the position of the fiber the power distribution among the modes is changed, thus changing the individual mode illumination magnitude. Consequently the mode interference pattern is altered. Thus a position modulation imposed on the fiber results in the modulation of the mode interference pattern. Provided the modulation is applied at a frequency greater than the eye integration bandwidth, then the apparent speckled image obtained by mode interference is reduced and may become unnoticeable.

Still another advantage may be speckle reduction in images produced by head-up and/or head-mounted imaging systems. For example, the bright and dark spots that are typically present in the lines, characters, and symbols that make up the projected picture in such systems may be reduced. As a result, the image may appear more continuous to the viewer, greater detail density becomes possible and smaller objects become more apparent.

Other technical advantages will be readily ascertainable by one of skill in the art.

BRIEF DESCRIPTION OF THE FIGURES

For a more complete understanding of the invention, and for further features and advantages, reference is now made to the following description, taken in conjunction with the accompanying drawings, in which.

DETAILED DESCRIPTION OF EXAMPLE EMBODIMENTS

Figure 1:
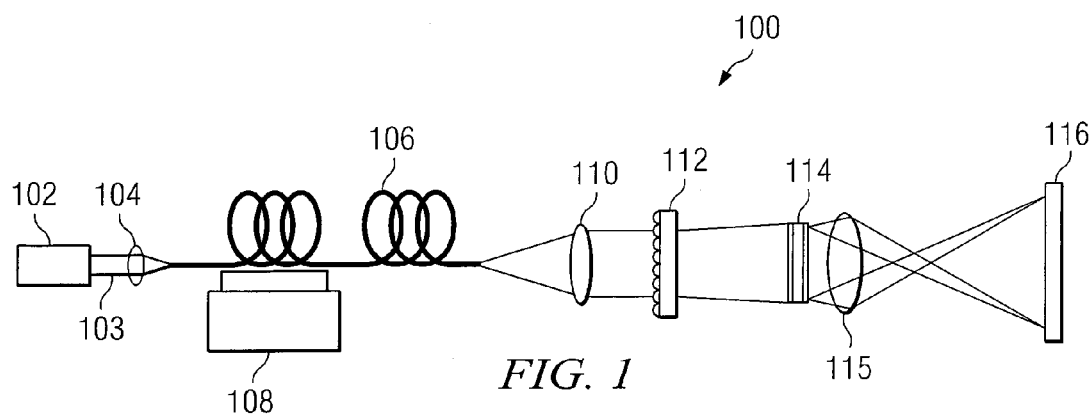
FIG. 1 is a schematic diagram illustrating a system for reducing speckle in an imaging system, according to an embodiment of the present disclosure.

Particular embodiments of the invention and its advantages are best understood by referring to FIGS. 1-6 of the drawings, like numerals being used for like and corresponding parts of the various drawings.

When a light beam produced by a coherent source of radiation, such as that from a laser, is projected for viewing, a noticeable pattern may underlie the projected image. The underlying pattern, also known as "speckle," cannot be easily accommodated by the human eye. As a result, the projected image may appear grainy to the viewer. For example, when a coherent source of radiation is used to project an image in a head-up or head-mounted display system, the lines, characters, and symbols that make up the projected image may include bright and dark spots. The projected symbology may also appear broken-up instead of continuous.

A speckle pattern is a granular intensity pattern produced by the mutual interference of a set of wavefronts in the eye retina or on a camera due to the target surface. A familiar example is the random pattern created when a laser beam is scattered off of a rough surface of random roughness. Also, in the output of a multimode optical fiber, a speckle pattern results from a superposition of mode field patterns. If the relative modal group velocities change with time, the speckle pattern will also change with time. On exiting the fiber the modes interfere with one another according to their phase difference thus causing modal noise. The disclosed embodiments described in this specification relate generally to the field of laser generation of "speckle free" images, and "speckle free" laser projection. For purposes of this specification, "speckle free" refers to an image having relatively low speckle, such that a relatively high quality image is obtained. In particular embodiments, the invention encompasses methods and systems for forming relatively smooth, generally speckle free images on a screen, including but not limited to motion images and/or varying symbology. Thus, the appearance of artifacts may be reduced, and highly resolvable details may be produced. It will be appreciated by those having ordinary skill in the art, that particular embodiments of the invention may be particularly useful for head-up displays (HUD), and head-mounted displays (HMD).

More specifically, particular embodiments of the present invention disclose a method and apparatus for the despeckling of an image illuminated by a coherent source, such as laser. Certain of these embodiments may employ any one or more of: (i) an optical multimode fiber, (ii) mechanical ditherer, and (iii) lens and (iv) microlens array set. In a particular embodiment, a source beam may be coupled into the optical multimode fiber, then outcoupled from the optical multimode fiber, contracted (i.e., concentrated) by the lens, aimed at the microlens array and projected onto a target. In such an embodiment, the target may include, but not limited to, a screen, diffuser, or camera.

A certain portion of the length of the multimode fiber may be set on the mechanical ditherer to provide periodic mechanical displacement to all or a portion of the multimode fiber. For example, the ditherer may include, but is not limited to, an acoustic shaker. As a result, the apparent speckle may be substantially reduced, producing a predominantly smooth image. Thus, in accordance with a particular embodiment of the present invention, a laser illuminated object may form a substantially speckle free image.

In a particular embodiment of the invention, the microlens array may comprise an ENGINEERED DIFFUSER™. In such an embodiment, the system of the present disclosure may result in a speckle contrast of 20%, which is generally considered to be a very good image quality. In this deposition, the speckle contrast is defined as the ratio between the difference and the sum of the maximal and minimal intensities in the optical field at the target.

An underlying phenomenon to teachings of the present disclosure is that a coherent beam traveling through a multimode fiber propagates in many sustainable modes, each having its individual group velocity. For a given position of the fiber, each mode receives a fraction of the optical power running in the fiber corresponding to a weight coefficient, such that the total electric field associated with the optical illumination is the weighted sum of the mode electric fields. On exiting the fiber the modes interfere with one another according to their phase difference. The resulting pattern on a screen is known in the art as mode interference or modal noise.

Upon altering the position of the fiber, the power distribution among the modes is changed, thus changing the mode weight coefficients. Consequently the mode interference pattern is altered. In other words, a position modulation imposed on the fiber results in the modulation of the mode interference pattern. Provided the modulation is applied at a frequency greater than the eye integration bandwidth, then the apparent speckled image obtained by mode interference is reduced becoming unnoticeable, or generally "speckle free."

Still, in the absence of a microlens array (e.g., an ENGINEERED DIFFUSER™) in the optical path, a screen illuminated by the laser light emanating from the dithered multimode fiber results in a granular, speckled image due, at least in part, to the screen surface roughness. The contribution of the microlens array is that each microlens on its surface distributes an incident ray on much of the screen, and the interference appears as the granular pattern occurring between the expanding rays. These rays constitute waves originating from various fiber modes which, once modulated, modulate in turn the phase of the rays at the target, which again "smear out" for the human eye.

Laboratory experiments suggest that maximal speckle suppression may be obtained when the fiber is vibrated at approximately 60-75 Hz. Speckle suppression is gradually reduced for lower frequencies, where the eye begins resolving the speckles. Speckle suppression is also gradually reduced for higher frequencies due to the mechanical response of the ditherer.

Some other attributes of the ENGINEERED DIFFUSER™ include beam homogenization and arbitrary illumination spot conversion. Both contribute directly to a homogeneous image and high transmission efficiency over the object which is constituted, for instance, by a spatial modulator such as a Liquid Crystal or MEMS array (e.g., DLP). Without activating the ditherer, speckle contrast of 65% may be obtained in the laboratory, which in not considered in the art to be a high quality image, and the image may appear to be jagged to the observer.

By adding the effect of dither to the illumination fiber, the contrast for the image with the microlens array may be improved to 20%. This is a speckle contrast magnitude considered in the art to be a substantially good image quality.

The teachings of the present disclosure are particularly applicable to, but not limited to, head-up displays with partially transmissive surfaces used as a target, known in the art as a "combiner." In another embodiment, one or more of the disclosed embodiments may be particularly applicable to, but not limited to, head mounted displays with partially transmissive surfaces used as a target, known in the art as a "combiner." In yet another embodiment, the teachings of the present disclosure may be particularly suitable for laser projection.

FIG. 1 is a schematic diagram illustrating one approach for reducing speckle in an imaging system 100. System 100 incorporates aspects of the present disclosure and is described in more detail below. Referring to FIG. 1, for example, a source of coherent radiation (e.g., a laser 102) emits a collimated source beam 103 coupled by beam coupler 104 to the multimode fiber 106. The multimode fiber 106 of FIG. 1 is mounted on a ditherer 108. Out of the multimode fiber 106, the beam 103 is outcoupled by lens 110 and directed on the microlens array 112. Then, the beam propagates to a preselected, designated distance to the spatial modulator 114. The spatial modulator 114 is imaged via imaging lens 115 on the target screen 116.

Multimode fiber 106 may be an optical fiber comprising a core and a cladding in which the core of optical fiber 106 has a higher refractive index than the cladding of optical fiber. As a result, electromagnetic radiation is guided in the fiber core along its length. In another particular embodiment, optical fiber 106 may consist of a hollow optical fiber. In yet another embodiment, optical fiber 106 may constitute a light guide.

In preferred embodiments, however, multimode fiber 106 may support many propagation paths or transverse modes. Multimode fibers have a larger diameter than single mode fibers. For example, whereas the diameter of the core of a single mode optical fiber may be on the order of 4-10 micrometers, the diameter of the core of a multimode fiber may be on the order of 50 micrometers to 1 millimeter. An increase in the diameter of the core of a multimode fiber approximately quadratically increases the number of modes sustained by the optical fiber. In a particular embodiment, multimode optical fiber 106 may include a step index fiber having a core diameter on the order of 105 to 400 micrometers.

While the losses associated with a multimode fiber may be very low and the disruption to the phase of light going through optical fiber 106 may be very subtle, each mode supported by multimode optical fiber 106 may propagate at a slightly different group velocity. Accordingly, the fundamental mode may exit optical fiber 106 at the fastest rate, and every successive higher mode may lag in its exit from optical fiber 106. As a result, the emanations of the various modes on a screen or a diffuser may interfere with one another according to their phase difference. The projected image results in mode interference or modal noise, which may also be termed "speckle."

For a given physical position of the optical fiber, however, each mode in a multimode optical fiber 106 carries a fraction of the optical power running in optical fiber 106. The fraction associated with each mode corresponds to a weight coefficient such that the total electric field associated with the optical illumination is the weighted sum of the modes. Because optical fiber 106 is flexible, the position of optical fiber 106 may be varied in space. For example, optical fiber 106 may be coiled on a spool, straightened to its full length, or set in loops, as shown in FIG. 1.

Ditherer 108 provides periodic mechanical displacement of optical fiber 106. Thus, ditherer 108 imposes a position modulation on at least a portion of optical fiber 106. In particular embodiments, ditherer 108 may include a dithering stage that operates on an acoustic shaker. Ditherer 108 vibrates optical fiber 106 to continually alter the position of optical fiber 106 in space.

In accordance with a particular embodiment of the present disclosure, the system of FIG. 1, without the microlens array 112 or spatial modulator 114, and with the ditherer 108 inactive, may generate an image on the target screen 116 having a speckle contrast of approximately 88%. In another embodiment, the system of FIG. 1, without the microlens array 112 or spatial modulator 114, but with an active ditherer 108 realized by an acoustic diaphragm vibrated at a frequency of 70 Hz, may generate an image on the target screen 116 having a speckle contrast of approximately 85%. In another embodiment, the system of FIG. 1, using the microlens array but without the spatial modulator 114, and with the ditherer 108 inactive, may generate an image on the target screen 116 having a speckle contrast of approximately 65%. In another embodiment, the system of FIG. 1, without the spatial modulator 114, but with an active ditherer 108 realized by an acoustic diaphragm vibrated at a frequency of 70 Hz, may generate an image on the target screen 116 having a speckle contrast of approximately 20%.

Figure 2:
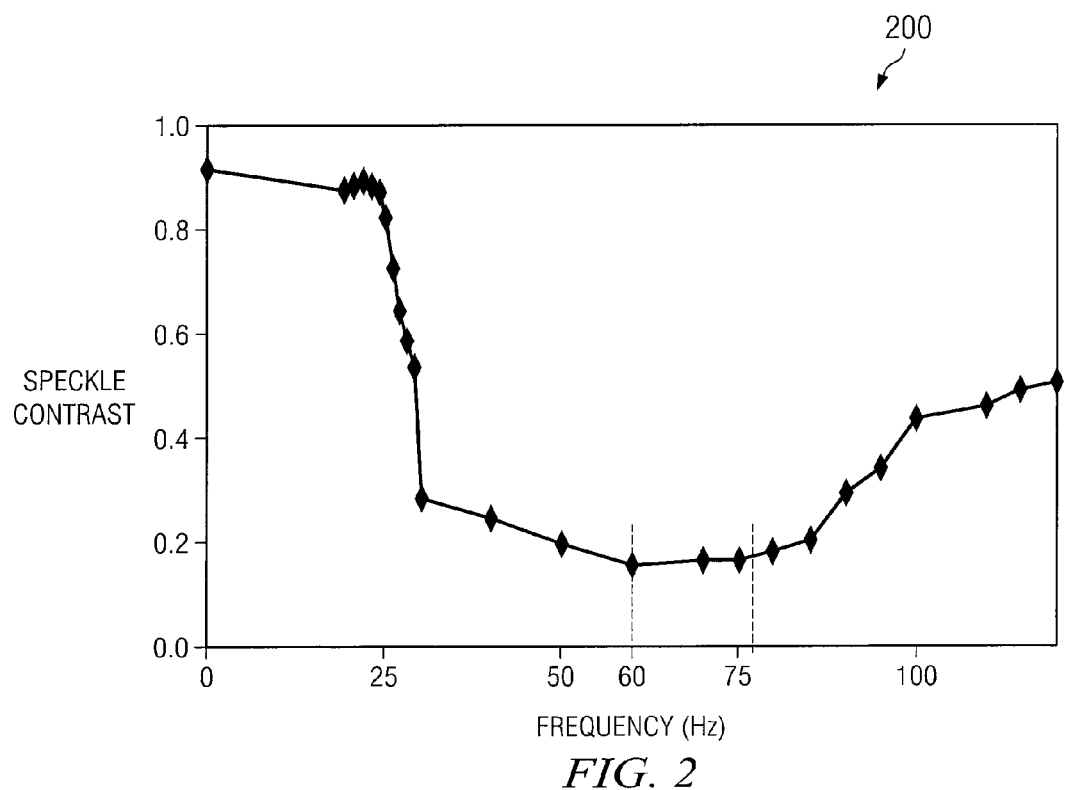
FIG. 2 is a graph illustrating speckle contrast results as a function of the electrical frequency applied to dither an optical fiber, according to an embodiment of the present disclosure.

In particular embodiments, ditherer 108 may be electrically controlled using a voltage selectively applied to result in a predictable reduction in speckle contrast. FIG. 2 depicts a graph 200 illustrating speckle contrast results as a function of the electrical frequency applied to modulate optical fiber 106. Specifically, vibration frequencies between 0 and 115 Hz were applied to ditherer 108 to modulate optical fiber 106. Where no electrical voltage is applied and optical fiber is not modulated at all, the speckle contrast is on the order of approximately 0.90 (90%). However, when an electrical voltage of greater than 25 Hz is applied to modulate optical fiber 106, the speckle contrast is reduced. As shown in FIG. 2, significant speckle contrast reduction occurs where the electrical voltage is between 30 and 100 Hz. At such frequencies, speckle contrast may be reduced to a value that is less than or nearly less than 0.2 (20%).

As can be seen in FIG. 2, the suppression of speckle in the image is gradually reduced for lower frequencies (less than 60 Hz), where the eye begins resolving the speckles. The suppression of speckle is also gradually reduced for higher frequencies (greater than 100 Hz) due to the mechanical response of ditherer 108. However, the optimum range for dithering optical fiber 106 to result in the greatest reduction in speckle contrast may occurs at an electrical voltage on the order of approximately 60 to 75 Hz. Thus, selective manipulation of the electrical voltage may be used to reduce speckle contrast to a predictable and manageable level.

Figure 3:
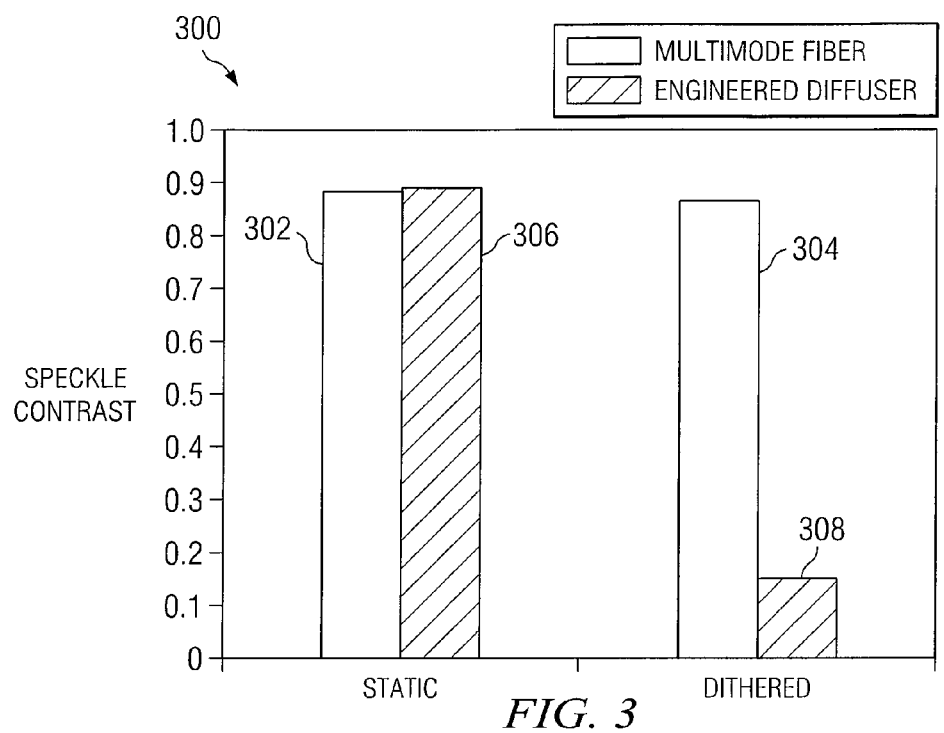
FIG. 3 is a graph illustrating speckle contrast results realized by various techniques according to one or more embodiments of the present disclosure.

FIG. 3 depicts a graph 300 illustrating speckle contrast results realized by the various techniques for reducing speckle that are discussed above. More specifically, FIG. 3 is a bar plot of speckle contrast that may be obtained with static and dithered fiber, with and without the microlens array. It includes a comparison of the speckle contrast for systems similar or identical to the system of FIG. 1, with and without an ENGINEERED DIFFUSER™. The speckle may be introduced into the image as a result of the inherent properties of both a multi-mode fiber and an imperfect display target.

Bar 302 illustrates speckle contrast results where a ditherer 108 is not used to mechanically vibrate the multimode optical fiber 106. As shown, a speckle contrast of approximately 88% may be observed. In contrast, bar 304 illustrates speckle contrast results when a ditherer 108 is used to mechanically vibrate the multimode optical fiber 106. Although the speckle contrast in such a system is less than the system where the optical fiber is not modulated, the observed speckle contrast of approximately 85% may not by itself be considered substantial improvement where additional speckle is introduced to the image by an imperfect target display.

In contrast to the previous scenarios, bar 306 illustrates speckle contrast results where a microlens array 112, such as an ENGINEERED DIFFUSER™, is used without the additional inclusion of a ditherer 108 for mechanically vibrating multimode optical fiber 106. As shown, the speckle contrast in such a scenario is not appreciably different from a system that includes neither a ditherer 108 nor a microlens array 112. However, bar 308 illustrates speckle contrast results where both a microlens array 112 and a ditherer 108 are used for combined speckle reduction. As can be seen, when both components are added to the system, the speckle contrast is reduced to a value that is less than 20%. Accordingly, if multiple sources of speckle are present in an image, speckle contrast may be most improved when the system incorporates both ditherer 108 and microlens array 112. It may be desirable, therefore, to provide an imaging system that includes both a ditherer 108 and a microlens array 112 to reduce the speckle effect observable in an image.

Microlens array 112 includes an optic component that includes multiple lenses formed in a one-dimensional or multi-dimensional array on a supporting substrate. In various embodiments, microlens array 112 may include thousands to millions of very small miniature lenses having a diameter on the order of approximately 50 to 100 micrometers.

In a particular embodiment, microlens array 112 may include an ENGINEERED DIFFUSER™ such as those offered by Thorlabs. The ENGINEERED DIFFUSER™ is made up of an array of dissimilar lenses where the diameter and focal lengths of the lenses may vary. The ENGINEERED DIFFUSER™ may be selected to create a desired footprint of the coherent radiation. For example, as desired for the particular imaging system, the ENGINEERED DIFFUSER™ may be selected to generate beams that are rectangular, square, circular, or another shape. An ENGINEERED DIFFUSER™ configured to generate beams of a square shape may be suitable for use with a head-up or head-mounted imaging system, in particular embodiments.

The microlens array 112 also operates to redirect the various vectors with in the beam so that the beamlets diverge to create overlapping light incident on the screen 116, or other diffuser, combiner, or other target display. In a particular embodiment, where the lenses of the microlens array 112 include positive lenses and have a diameter on the order of 50 to 100 micrometers, the focal length of such lenses may be a few hundred micrometers. The beamlets exit the microlens array 112 and diverge to overlapping points over the focal length of microlens array 112. Thus, when the beamlets are focused on the screen 116 positioned at a distance from the microlens array 112 that is greater than the distance of the focal length, the diverging beamlets overlap one another on the screen 116. Because the beamlets overlap one another, the combination includes the difference between the different average phases and average amplitudes of the beamlets. The combination of vectors received by the retina is dynamic however averages over the integration time of the eye and results in the reduced perception of speckle by the viewer.

In this manner, microlens array 112 may further reduce speckle contrast in the resulting image projected on screen 116 where speckle may be introduced by imperfections in the screen 118. When this technique is combined with the dithering of optical fiber 106, the vectors modulated by the microlens array 112 correspond with the dithering of the fiber to substantially reduce speckle pattern in the image.

Figure 4:
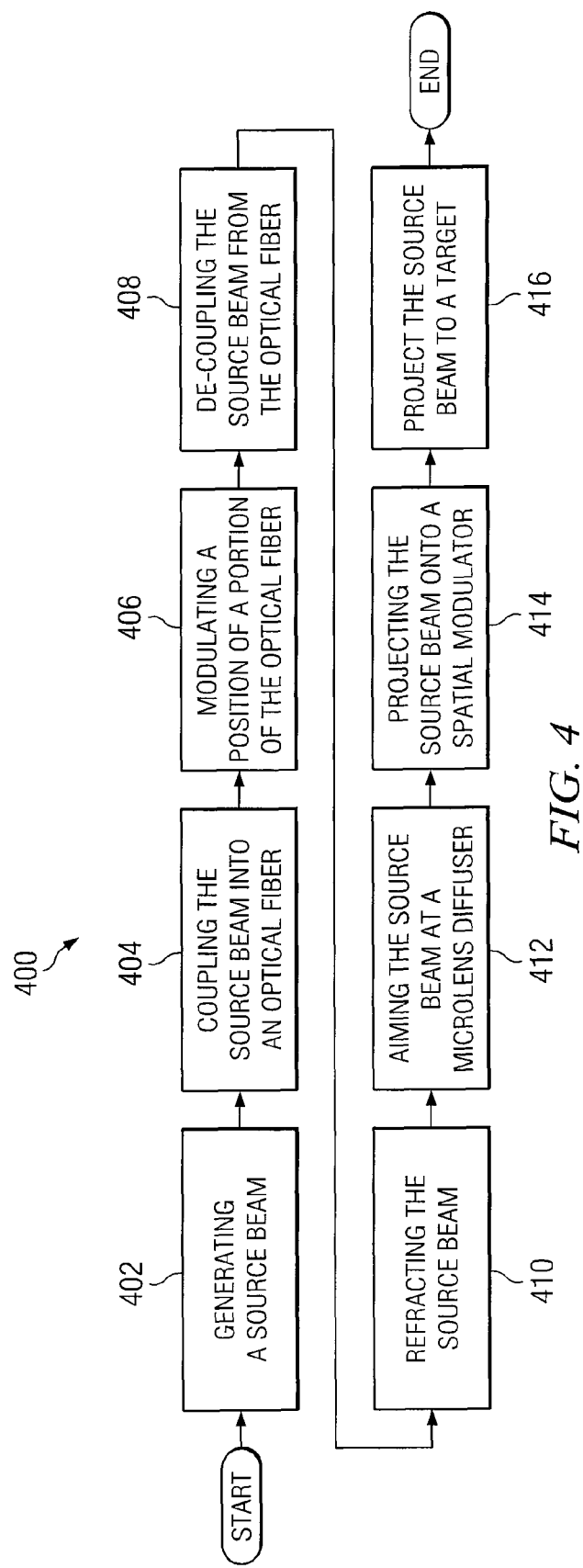
FIG. 4 is a flow diagram illustrating a method for reducing speckle in an imaging system, according to an embodiment of the present disclosure.

FIG. 4 illustrates a method 400 for reducing the speckle in an image generated by an image generation system. The method begins at step 402 where a source beam is generated. The source beam may originate from any coherent source of radiation. For example, in a particular embodiment of the present disclosure, the coherent source of radiation may comprise a laser source of electromagnetic radiation, a super radiating laser amplifier, or other coherent source of radiation. In some embodiments, the coherent radiation may be on the order of 400 and 750 nanometers such that it is visible by the human eye. In others, the coherent radiation may be greater than 750 nanometers such that it is not visible by the human eye.

At step 404, the source beam is coupled into an optical fiber. All, or a portion of the optical fiber may be coupled with a ditherer in order to impose a position modulation thereupon, for example at step 406.

Next, at step 408, the source beam is decoupled from the optical fiber and refracted by a lens at step 410. In this manner, the source beam is aimed at a microlens diffuser at step 412. The microlens diffuser may comprise an ENGINEERED DIFFUSER™. The microlens diffuser is positioned to project the source beam onto a spatial modulator which attributes an object pattern to the beam at step 414, the spatial modulator being positioned to project the source beam onto a target at step 416.

Figure 5:
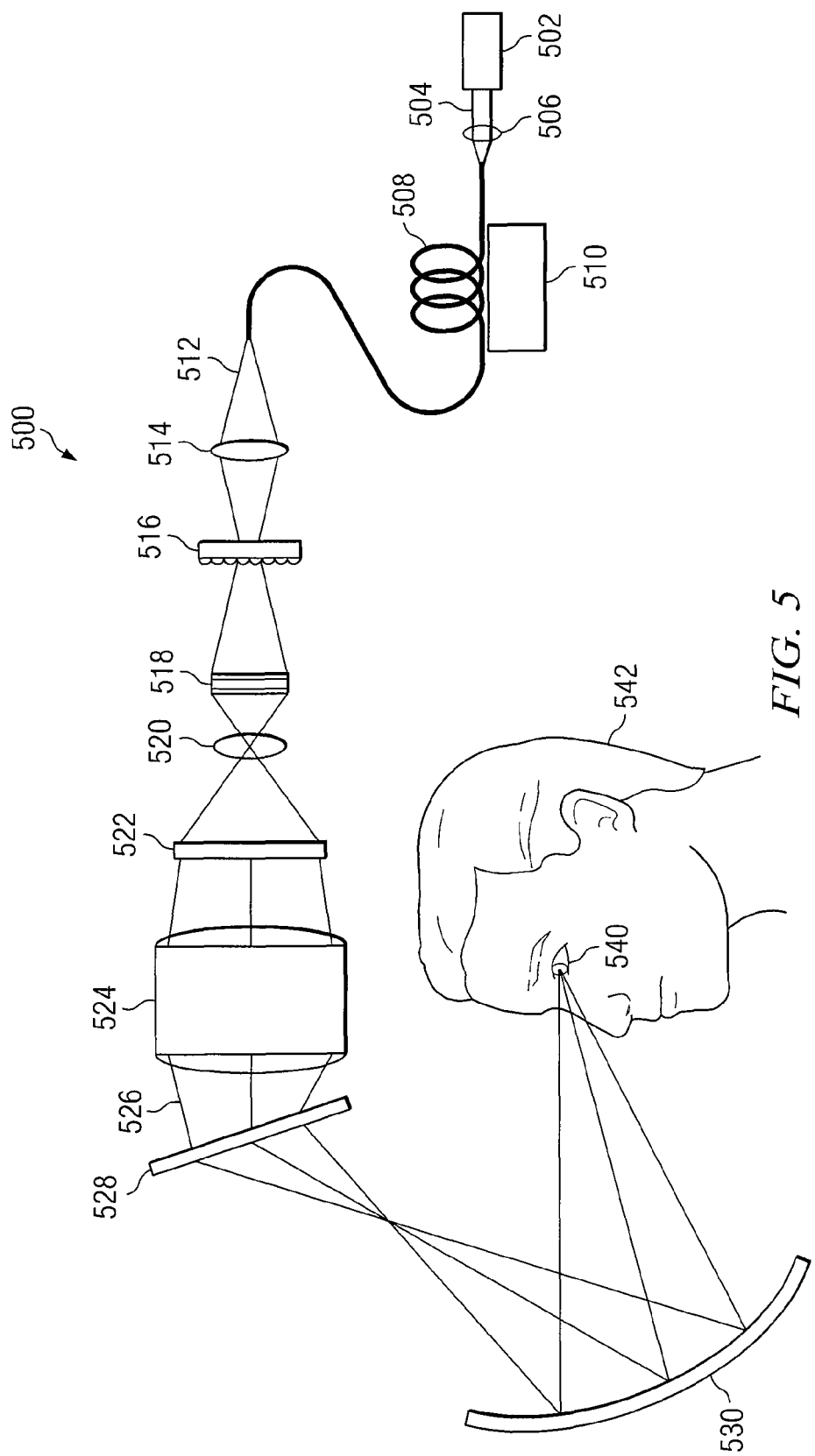
FIG. 5 is a schematic diagram illustrating a system for reducing speckle, according to another embodiment of the present disclosure.

FIG. 5 is a schematic diagram illustrating a HUD system 500 with a subsystem for reducing speckle in its imaging system, according to an embodiment of the present disclosure.

Referring to FIG. 5, for example, a source of coherent radiation (e.g., a laser 502) emits a collimated source beam 504 coupled by beam coupler 506 to the multimode optical fiber 508. The multimode optical fiber 508 of FIG. 5 is mounted on a ditherer 510. Out of the multimode fiber 508, the beam 504 is outcoupled by lens 514 and directed on the microlens array 516. Then, the beam propagates to a preselected, designated distance to the spatial modulator 518. The spatial modulator 518 is imaged via imaging lens 520 on the target screen, for example diffuser 522. In particular embodiments, the multimode fiber 508 may support many propagation paths or transverse modes. In another embodiment, multimode optical fiber 508 may include a step index fiber having a core diameter on the order of 105 to 400 micrometers.

Each mode supported by multimode optical fiber 508 may propagate at a slightly different group velocity. Accordingly, the fundamental mode may exit optical fiber 508 at the fastest rate, and every successive higher mode may lag in its exit from optical fiber 508. As a result, the emanations of the various modes on the diffuser 522 may interfere with one another according to their phase difference. The projected image results in mode interference or modal noise, which may also be termed "speckle."

For a given physical position of the optical fiber, however, each mode in a multimode optical fiber 508 carries a fraction of the optical power running in optical fiber 508. The fraction associated with each mode corresponds to a weight coefficient such that the total electric field associated with the optical illumination is the weighted sum of the modes. Because optical fiber 508 is flexible, the position of optical fiber 508 may be varied in space. For example, optical fiber 508 may be coiled on a spool, straightened to its full length, or set in loops, as shown in FIG. 5.

Ditherer 510 provides periodic mechanical displacement of optical fiber 508. Thus, ditherer 510 imposes a position modulation on at least a portion of optical fiber 508. In particular embodiments, ditherer 510 may include a dithering stage that operates on an acoustic shaker. Ditherer 510 vibrates optical fiber 508 to continually alter the position of optical fiber 508 in space.

In accordance with a particular embodiment of the present disclosure, the system of FIG. 5, without the microlens array 516 or spatial modulator 518, and with the ditherer 510 inactive, may generate an image on the diffuser 522 having a speckle contrast of approximately 88%. In another embodiment, the system of FIG. 5, without the microlens array 516 or spatial modulator 518, but with an active ditherer 510 realized by an acoustic diaphragm vibrated at a frequency of 70 Hz, may generate an image on the diffuser 522 having a speckle contrast of approximately 85%. In another embodiment, the system of FIG. 5, using the microlens array but without the spatial modulator 518, and with the ditherer 510 inactive, may generate an image on the diffuser 522 having a speckle contrast of approximately 65%. In another embodiment, the system of FIG. 5, without the spatial modulator 518, but with an active ditherer 510 realized by an acoustic diaphragm vibrated at a frequency of 70 Hz, may generate an image on the diffuser 522 having a speckle contrast of approximately 20%.

Referring to FIG. 5, the diffuser 522 emanates optical rays containing the spatial content generated by the spatial modulator 518 that propagate to a relay lens group 524. The relayed rays 526 are bent by a prism 528 thus directed towards and partially reflected from a combiner 530 which, while transmitting most of the incident light from the left hand side of FIG. 5 propagating to the right hand side, reflects much of the projected rays 526 towards the observer's 542 eyes 540. In a preferred embodiment the prism 528 comprises a flat piece for instance a Fresnel prism or a holographic prism. In an embodiment, the combiner 530 reflects at least 65% of the incident light rays 526.

Figure 6:
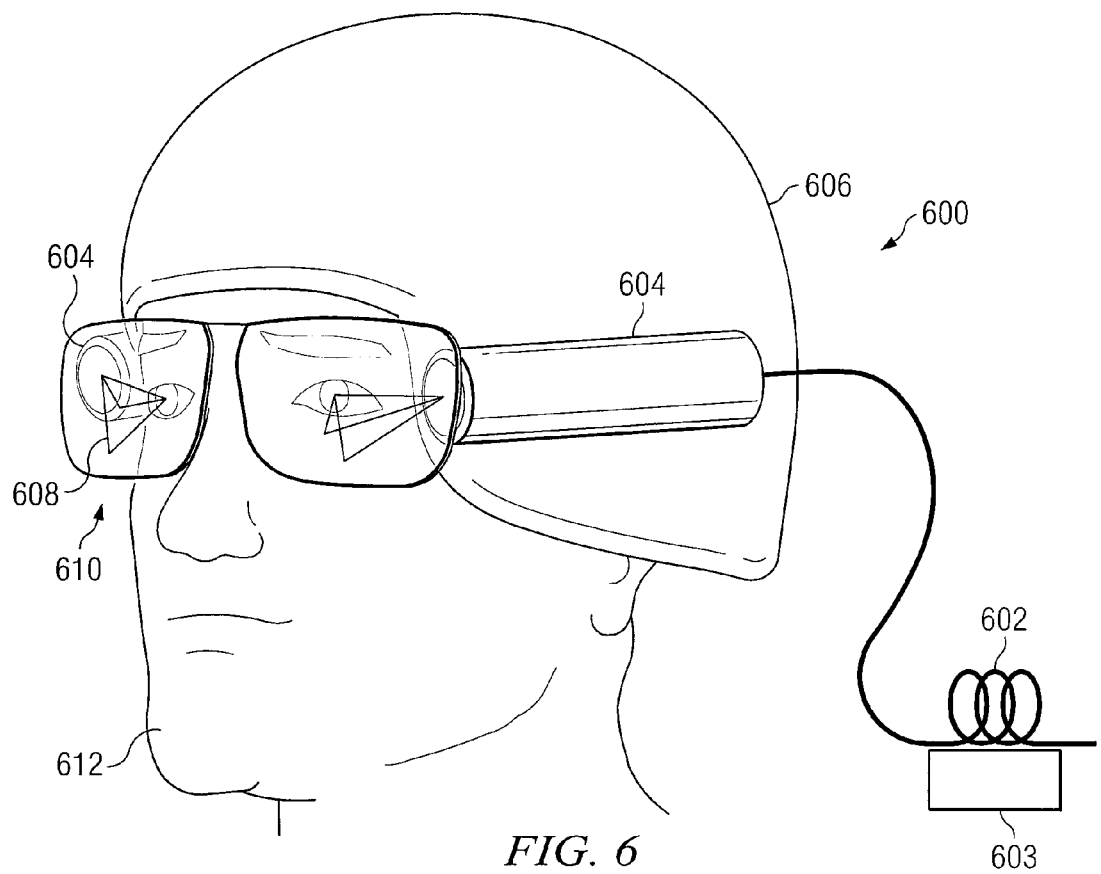
FIG. 6 is a schematic diagram illustrating a system for reducing speckle, according to yet another embodiment of the present disclosure.

FIG. 6 is a schematic diagram illustrating a Head Mounted Display (HMD) system 600 with a subsystem for reducing speckle in its imaging system, according to an embodiment of the present disclosure.

Referring to FIG. 6, for example, a multimode optical fiber embedded in a cable 602 guides coherent radiation (e.g., a laser) into an image generation unit 604 wherein included are the elements from 514 to 528 described in FIG. 5. The optical fiber is mounted on a ditherer 603. Two image generation units 604 mounted on a head gear or helmet 606 are used for the projection of visual data to each of two observer eyes. In an embodiment, the cable 602 may include electrical conduits which conduct electronic data to a spatial modulator. The image generation unit 604 emanates optical rays 608 containing spatial content directed towards and partially reflected from a visor combiner 610 which, transmitting most of the incident light from the left hand side of FIG. 6 propagating to the right hand side, reflects much of the projected rays 608 towards the observer's 612 eyes. In an embodiment, the visor combiner 610 reflects at least 65% of the incident light rays 608.

Although the present invention has been described in detail, it should be understood that various changes, substitutions, and alterations may be made hereto without departing from the spirit and scope of the invention as defined by the appended claim. Additionally, systems and methods incorporating some or a combination of the above-described techniques may benefit from some, none, or all of the following advantages. For example, according to one embodiment, sources of coherent light may be used to produce images with improved speckle contrast. Noticeable grainy patterns underlying the image may be reduced, and thus, viewer satisfaction with the imaging system may be improved.

Specifically, speckle caused by the inherent properties of multimode optical fibers may be reduced. By altering the position of the multimode optical fiber, for example, the power distribution in each mode supported by the optical fiber may be altered. Thus, the modulation of the position of the optical fiber may be electrically controlled using a voltage selectively applied to result in a predictable reduction in speckle contrast.

Additionally or alternatively, speckle introduced into an image due to surface roughness, scratches, digs, and other imperfections in the display surface may be reduced. For example, a microlens array may be used, in particular embodiments, to provide beam homogenization and arbitrary illumination conversion. The microlens array may transform a beam of coherent radiation into a multitude of beamlets that diverge to overlap each other on the screen, diffuser, combiner, or other target display. Because the beamlets overlap one another, combination of vectors received by the retina is dynamic however averages over the integration time of the eye and results in the reduced perception of speckle by the viewer.

A possible, but not limiting application for such techniques includes head-up and/or head-mounted imaging systems. Where the above described approaches are used to reduce speckle in the images produced by such systems, the bright and dark spots that are typically present in the lines, characters, and symbols that make up the projected picture in the systems may be substantially reduced or eliminated. As a result, the image may appear more continuous to the viewer. Additionally, because the target display is not manipulated, the display system requires fewer moving parts, electrical conduits, and controllers associated with the target display. As a result, the components of the combiner or other display may be reduced in size, or miniaturized.

What is claimed is:

1. An image generation system, comprising:
  an optical fiber positioned to receive a source beam from a coherent optical source;
  a ditherer being coupled with the optical fiber and operable to modulate a position of at least a portion of the optical fiber;
  a lens configured to refract the source beam, such that the source beam is aimed at a microlens diffuser;
  the microlens diffuser being positioned to project the source beam onto a spatial modulator; and
  the spatial modulator positioned to project the source beam via an imaging lens, to a target.

2. The system of claim 1, wherein the coherent optical source comprises a laser.

3. The system of claim 1, wherein the microlens diffuser comprises an engineered diffuser.

4. The system of claim 1, wherein the optical fiber comprises an optical multimode fiber.

5. The system of claim 1, wherein the multimode fiber comprises a step index fiber having a core diameter of between 105 micrometers and 500 micrometers.

6. The system of claim 4, wherein the multimode fiber comprises a step index fiber having a core diameter greater than approximately 105 micrometers.

7. The system of claim 4, wherein the optical multimode fiber comprises a step index fiber having a core diameter of approximately 200 micrometers.

8. The system of claim 4, wherein the multimode fiber is a step index fiber having a core diameter less than approximately 400 micrometers.

9. The system of claim 1, wherein the ditherer comprises a mechanical vibration stage.

10. The system of claim 1, wherein the ditherer is modulated at 30 Hz or more.

11. The system of claim 1, wherein the target comprises a screen.

12. The system of claim 1, wherein the target comprises a diffuser.

13. The system of claim 1, wherein the target comprises a camera.

14. The system of claim 1, wherein the microlens diffuser is disposed within a headup display unit.

15. The system of claim 14, wherein the headup display comprises a projector including a spatial modulator disposed therein.

16. The system of claim 1, wherein the target comprises an optical surface transmitting nearly all of the visible spectrum except for a narrowband wavelength band of the coherent optical source, and having a reflection of at least 60% in the narrowband wavelength band.

17. The system of claim 15, wherein the microlens diffuser is positioned before the spatial modulator.

18. The system of claim 17, wherein the microlens diffuser comprises an engineered diffuser.

19. A method for generating an image, comprising:
    coupling a source beam received from a coherent optical source into an optical fiber;
    modulating a position of at least a portion of the fiber using a ditherer;
    refracting the source beam at a lens after it is decoupled from the optical fiber, such that the source beam is aimed at a microlens diffuser; and
    projecting the source beam from the microlens diffuser onto a spatial modulator; and
    positioning the spatial modulator to project the source beam via an imaging lens, to a target.

20. The method of claim 19, further comprising displaying an image formed by the projected source beam onto the target, the image appearing with a speckle contrast of at least 20%.

21. The method of claim 19, wherein the coherent optical source comprises a laser, and further comprising propagating the source at a wavelength range of 510-550 nanometers.

22. The method of claim 19, wherein the coherent optical source comprises lasers having wavelength ranges of 400-500 nanometers, 510-550 nanometers, and 590-700 nanometers, respectively.

23. A Head-up Display (HUD) system, comprising:
    an optical fiber positioned to receive a source beam from a coherent optical source;
    a ditherer being coupled with the optical fiber and operable to modulate a position of at least a portion of the optical fiber;
    a lens configured to refract the source beam, such that the source beam is aimed at a microlens array;
    the microlens array being positioned to project the source beam onto a spatial modulator;
    the spatial modulator positioned to project the source beam via an imaging lens, to a diffuser;
    a relay lens group being positioned to relay optical rays propogated from the diffuser; and
    a prism being configured to bend the relayed optical rays and direct the relayed rays toward a combiner.

24. A Head Mounted Display (HMD) system, comprising:
    an optical fiber embedded in a cable, the optical fiber being positioned to receive a source beam from a coherent optical source and guide the source beam to a plurality of image generation units that are coupled to head gear; and
    a ditherer being coupled with the optical fiber and operable to modulate a position of at least a portion of the optical fiber;
    each image generation unit comprising:
        a lens configured to refract the source beam, such that the source beam is aimed at a microlens diffuser;
        the microlens diffuser being positioned to project the source beam onto a spatial modulator; and
        the spatial modulator positioned to project the source beam via an imaging lens, to a visor combiner that is coupled with the head gear.

* * * * *